United States Patent
Chang et al.

(10) Patent No.: US 10,702,845 B2
(45) Date of Patent: Jul. 7, 2020

(54) REACTION METHOD WITH HOMOGENEOUS-PHASE SUPERCRITICAL FLUID

(71) Applicant: NATIONAL SUN YAT-SEN UNIVERSITY, Kaohsiung (TW)

(72) Inventors: Ting-Chang Chang, Kaohsiung (TW); Chih-Yang Lin, Kaohsiung (TW); Tsung-Ming Tsai, Kaohsiung (TW); Chih-Cheng Shih, Kaohsiung (TW); Ming-Hui Wang, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 16/128,802

(22) Filed: Sep. 12, 2018

(65) Prior Publication Data

US 2019/0009239 A1   Jan. 10, 2019

Related U.S. Application Data

(63) Continuation-in-part of application No. 15/291,577, filed on Oct. 12, 2016, now abandoned.

(30) Foreign Application Priority Data

May 26, 2016 (TW) .............................. 105116469 A

(51) Int. Cl.
 *B01J 3/00* (2006.01)
 *B01J 19/00* (2006.01)
 *B01F 3/00* (2006.01)

(52) U.S. Cl.
 CPC ......... *B01J 19/0006* (2013.01); *B01F 3/0092* (2013.01); *B01J 3/008* (2013.01); *B01F 2003/0064* (2013.01); *B01J 2219/00051* (2013.01); *B01J 2219/00162* (2013.01); *B01J 2219/00164* (2013.01); *B01J 2219/00186* (2013.01)

(58) Field of Classification Search
 CPC ........................................................ B01J 3/008
 See application file for complete search history.

(56) References Cited

U.S. PATENT DOCUMENTS

| 5,676,737 | A  | 10/1997 | Whitlock |
| 6,099,619 | A  | 8/2000  | Lansbarkis et al. |
| 6,805,801 | B1 | 10/2004 | Humayun et al. |
| 2006/0079725 | A1 | 4/2006 | Li et al. |
| 2017/0341050 | A1* | 11/2017 | Chang ..................... B01J 3/008 |

FOREIGN PATENT DOCUMENTS

CN         1118997 A      3/1996

* cited by examiner

*Primary Examiner* — Matthew P Coughlin
(74) *Attorney, Agent, or Firm* — WPAT, PC

(57) ABSTRACT

A reaction method with a homogeneous-phase supercritical fluid includes introducing a first fluid into a mixing chamber. A mass is less than or equal to that can be absorbed by the molecular sieve component, totally absorbing the first fluid by the molecular sieve component. A second fluid is introduced into the mixing chamber with a mass being greater than that can be absorbed by the molecular sieve component. A temperature and a pressure in the mixing chamber are adjusted to a critical temperature and a critical pressure of the second fluid, respectively, releasing the first fluid in supercritical phase from the molecular sieve component into the mixing chamber, followed by homogeneously mixing with the second fluid in supercritical phase in the mixing chamber to obtain a homogeneous-phase mixing fluid. The homogeneous-phase mixing fluid is then introduced into a reaction chamber connected to the mixing chamber.

6 Claims, 1 Drawing Sheet

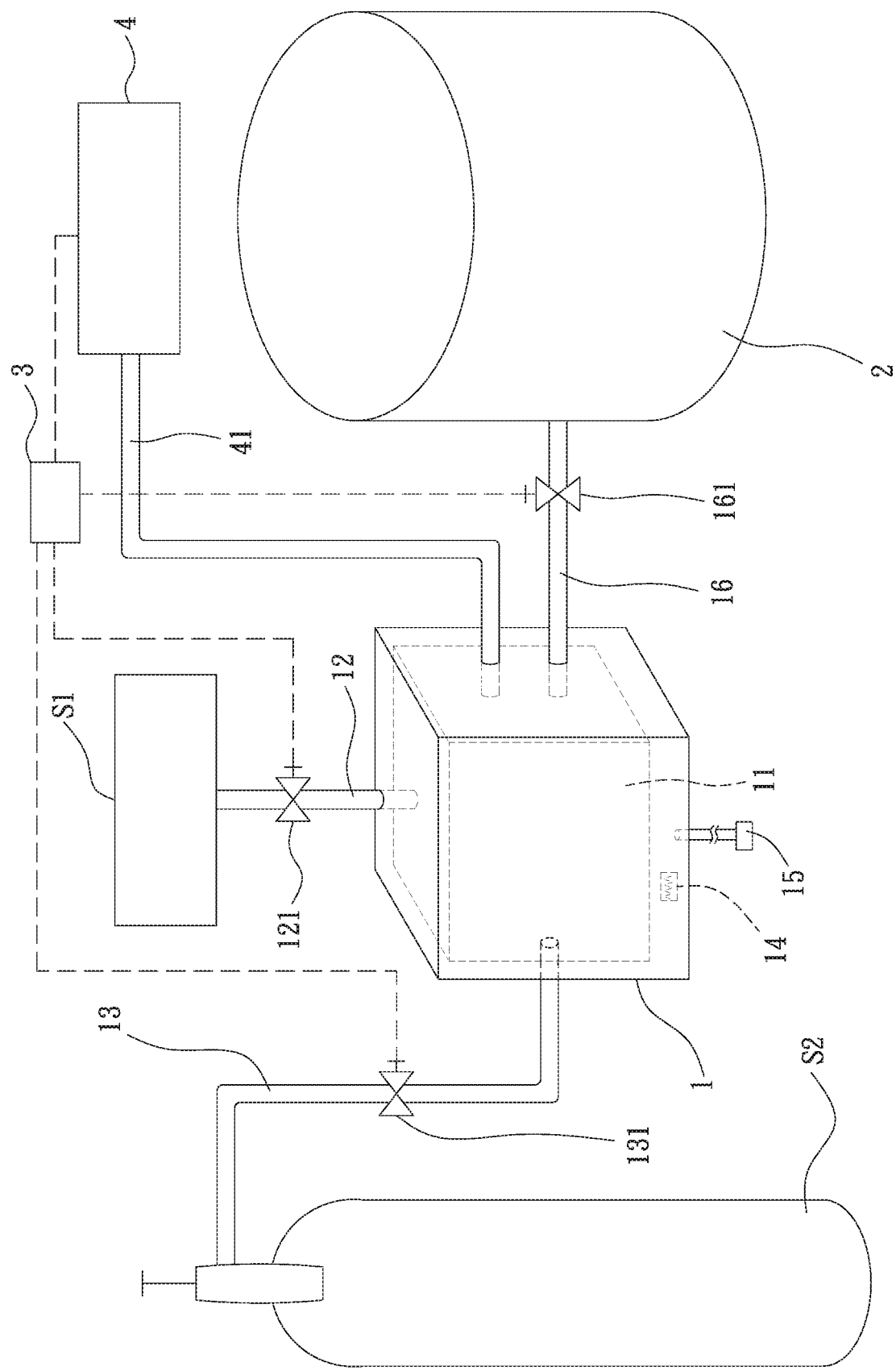

REACTION METHOD WITH HOMOGENEOUS-PHASE SUPERCRITICAL FLUID

CROSS REFERENCE TO RELATED APPLICATIONS

This is a continuation-in-part application of U.S. patent application Ser. No. 15/291,577 filed on Oct. 12, 2016, and claims the benefit of Taiwan application serial No. 105116469, filed May 26, 2016, the entire contents of which are incorporated herein by reference.

BACKGROUND OF THE INVENTION

1. Field of the Invention

The present invention generally relates to a reaction method with a supercritical fluid and, more particularly, to the reaction method with a homogeneous-phase supercritical fluid.

2. Description of the Related Art

During production of resistive memory, surface treatment is conducted to the resistive memory using a mixing fluid. The mixing fluid includes a fluid in gas phase (e.g. carbon dioxide) and a fluid in liquid phase (e.g. water) with a great difference on the mass of the fluid in gas phase and that of the fluid in liquid phase. Therefore, when mixing the fluid in gas phase with the fluid in liquid phase, due to the difference on the specific gravity of the fluid in gas phase and the fluid in liquid phase, it is difficult to homogeneously mix the two fluids in a short time, and a heterogeneous-phase mixing fluid can only be formed. Since the surface treatment to the resistive memory is conducted using such heterogeneous-phase mixing fluid, the resistive memory presents characteristics with local differences, adversely affecting electrical property and performance of the resultant resistive memory.

In light of this, it is necessary to improve the conventional reaction method with supercritical fluid and apparatus for supercritical fluid reaction.

SUMMARY OF THE INVENTION

It is therefore an objective of the present invention to provide a reaction method with a homogeneous-phase supercritical fluid with similar characteristics to graphene.

One embodiment of the present invention discloses a reaction method with a homogeneous-phase supercritical fluid. The method includes introducing a first fluid into a mixing chamber. A mass of the first fluid into the mixing chamber is less than or equal to that can be absorbed by the molecular sieve component, totally absorbing the first fluid by the molecular sieve component. A second fluid is introduced into the mixing chamber with a mass of the second fluid into the mixing chamber being greater than that can be absorbed by the molecular sieve component. A temperature and a pressure in the mixing chamber are adjusted to a critical temperature and a critical pressure of the second fluid, respectively, releasing the first fluid in supercritical phase from the molecular sieve component into the mixing chamber, followed by homogeneously mixing with the second fluid in supercritical phase in the mixing chamber to obtain a homogeneous-phase mixing fluid. The homogeneous-phase mixing fluid is then introduced into a reaction chamber connected to the mixing chamber for conducting a reaction.

Accordingly, by absorbing the first fluid using the molecular sieve component in the mixing chamber, the first fluid can distribute in pores of the molecular sieve component. The first fluid is converted into the first supercritical fluid by adjusting the temperature and the pressure in the mixing chamber, and is then released from the pores of the molecular sieve component into the second supercritical fluid (the second fluid in supercritical phase). Therefore, the first supercritical fluid can homogeneously mix with the second supercritical fluid to form the homogeneous-phase mixing fluid. The homogeneous-phase mixing fluid can be utilized in the wide variety of reactions.

In an example, the first fluid and the second fluid are a fluid in liquid phase and a fluid in gas phase, respectively. As an example, the first fluid can be the fluid in liquid phase selected from water, ethanol, acetone, oxalic acid, ammonia or sulfuric acid, and the second fluid can be the fluid in gas phase selected from carbon dioxide, methane, ethane, propane, ethylene or propylene. Moreover, the molecular sieve component can include an A-type or X-type molecular sieve. Alternatively, the molecular sieve component can include molecular sieve material made of aluminum oxide, silicon oxide and stainless steel sintered together. As such, the first fluid, the second fluid and the molecular sieve can be selected from a large variety to meet different needs.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

The sole FIGURE is a schematic diagram of an apparatus for homogeneous-phase supercritical fluid reaction according to the present disclosure.

In the various figures of the drawings, the same numerals designate the same or similar parts. Furthermore, when the term "first", "second" "third" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

A reaction method with a homogeneous-phase supercritical fluid according to an embodiment of the present disclosure can be carried out using an apparatus shown in sole FIGURE. The apparatus can include: a mixing chamber 1 and a reaction chamber 2 connecting to the mixing chamber 1. A molecular sieve component 11 is installed in the mixing chamber 1. When a first fluid is introduced into the mixing chamber 1, the first fluid can be absorbed by the molecular sieve component 11 in the mixing chamber 1. The first fluid absorbed by the molecular sieve component 11 is then converted into a first supercritical fluid (the first fluid in supercritical phase), and is gradually released into the mixing chamber 1 filled by a second supercritical fluid (a second fluid in supercritical phase). Therefore, the first supercritical fluid can be homogeneously mixed with the second supercritical fluid to form a homogeneous-phase mixing fluid.

After that, the homogeneous-phase mixing fluid can be introduced into the reaction chamber 2 to conduct a reaction.

Specifically, the mixing chamber 1 can be connected to a first fluid source 51 via a first pipeline 12. The first fluid source 51 is used for providing the first fluid in either liquid phase or gas phase. The first fluid can be introduced into the mixing chamber 1 via the first pipeline 12, and can be absorbed by the molecular sieve component 11 in the mixing chamber 1. A first valve 121 can be arranged on the first pipeline 12 for controlling the flow rate of the first fluid into the mixing chamber 1. It is worthy to noted that a mass of the first fluid into the mixing chamber 1 is less than or equal to that can be absorbed by the molecular sieve component 11. Therefore, the first fluid introduced into the mixing chamber 1 can be totally absorbed by the molecular sieve component 11.

The first fluid can be a fluid in liquid phase or gas phase in NTP (normal temperature and pressure). As an example, the first fluid can be the fluid in liquid phase in NTP such as water, ethanol, acetone, oxalic acid, ammonia and sulfuric acid, or a fluid in gas phase in NTP such as carbon dioxide, methane, ethane, propane, ethylene and propylene. In this embodiment, the first fluid is water.

Moreover, the molecular sieve component can be a vessel filled with molecular sieve material. As an example, the molecular sieve material can be of A-type (e.g. Linde type 3A, 4A or 5A) or X-type (e.g. type 13X), which is not limited in the present disclosure. In the present embodiment, the molecular sieve component comprises molecular sieve material made of aluminum oxide ($Al_2O_3$), silicon dioxide ($SiO_7$) and stainless steel sintered together. Since the molecular sieve material is porous, the solute can be absorbed in the pores.

After introducing the first fluid into the mixing chamber 1, the second fluid is introduced into the mixing chamber 1. The mixing chamber 1 can be connected to a second fluid source S2 via a second pipeline 13. The second fluid source S2 is used for providing the second fluid in either liquid phase or gas phase. The second fluid can be introduced into the mixing chamber 1 via the second pipeline 13. A second valve 131 can be arranged on the second pipeline 13 for controlling the flow rate of the second fluid into the mixing chamber 1. It is worthy to note that a mass of the second fluid into the mixing chamber 1 is greater than that can be absorbed by the molecular sieve component 11. Therefore, the second fluid is not totally absorbed by the molecular sieve component 11, and is present in the mixing chamber 1.

Moreover, the second fluid can be a fluid in gas phase or liquid phase in NTP (normal temperature and pressure). As an example, the second fluid can be the fluid in gas phase in NTP such as carbon dioxide, methane, ethane, propane, ethylene and propylene, or the fluid in liquid phase in NTP such as water, ethanol, acetone, oxalic acid, ammonia and sulfuric acid. In this embodiment, the second fluid is carbon dioxide.

Then, the temperature and the pressure in the mixing chamber 1 are adjusted. In detail, a temperature controller 14, as well as a pressure controller 15, is installed in the mixing chamber 1. The temperature and the pressure in the mixing chamber 1 can be adjusted to a predetermined temperature and a predetermined pressure by using the temperature controller 14 and the pressure controller 15, respectively. After the temperature and the pressure in the mixing chamber 1 reach the predetermined temperature and the predetermined pressure (the temperature and the pressure greater than the critical temperature and the critical pressure of the second fluid), both the first fluid and the second fluid in the mixing chamber 1 convert into supercritical phase to form the first supercritical fluid and the second supercritical fluid, respectively. At this time, the first supercritical fluid can be released by the molecular sieve component 11, and is mixed with the second supercritical fluid in the mixing chamber 1 to form the homogeneous-phase mixing fluid.

The homogeneous-phase mixing fluid in the mixing chamber 1 can then be introduced into the reaction chamber 2 via a third pipeline 16. The reaction chamber 2 can be designed to meet the requirement of a wide variety of reactions. As an example, according to the use of the homogeneous-phase mixing fluid such as surface treatment, cleaning, extraction or solute formation of powder, the reaction chamber 2 can be, but not limited to, a chamber for surface treatment, an extraction vessel or an expansion vessel. A third valve 161 can be arranged on the third pipeline 16 for controlling the flow rate of the homogeneous-phase mixing fluid into the reaction chamber 2.

A control component 3 can be used to control the flow rate of the first fluid and the second fluid into the mixing chamber 1, and to control the flow rate of the homogeneous-phase mixing fluid into the reaction chamber 2. Specifically, the control component 3 can be electrically connected with the first valve 121 and the second valve 131, adjusting the mass flow rates or the volumetric flow rates of the first fluid and the second fluid into the mixing chamber 1. Therefore, the ratio of the first fluid to the second fluid in the obtained homogeneous-phase can be adjusted. Moreover, the control component 3 can be electrically connected with the third valve 161, and therefore the flow rate of the homogeneous-phase mixing fluid into the reaction chamber 2 can be adjusted to meet the requirement.

Besides, a concentration detector 4 can be used to detect the ratio of the first fluid to the second fluid in the homogeneous-phase mixing fluid. The concentration detector 4 can be connected to the mixing chamber 1 via a fourth pipeline 41, and the concentration detector 4 can be electrically connected with the control component 3. The concentration detector 4 can detect the ratio of the first fluid to the second fluid in the homogeneous-phase mixing fluid to obtain a detection value. The detection value is then submitted to the control component 3, and then the control component 3 can control the flow rates through the first valve 121 and the second valve 131. Hence, the ratio of the first fluid to the second fluid can be adjusted with the control method described above.

Accordingly, by absorbing the first fluid using the molecular sieve component in the mixing chamber, the first fluid can distribute in pores of the molecular sieve component. The first fluid is converted into the first supercritical fluid by adjusting the temperature and the pressure in the mixing chamber, and is then released from the pores of the molecular sieve component into the second supercritical fluid (the second fluid in supercritical phase). Therefore, the first supercritical fluid can homogeneously mix with the second supercritical fluid to form the homogeneous-phase mixing fluid. The homogeneous-phase mixing fluid can be utilized in the wide variety of reactions.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A reaction method with a homogeneous-phase supercritical fluid, comprising:
   introducing a first fluid into a mixing chamber containing a molecular sieve component, wherein a mass of the first fluid into the mixing chamber is less than or equal to that can be absorbed by the molecular sieve component, totally absorbing the first fluid by the molecular sieve component;
   introducing a second fluid into the mixing chamber, wherein a mass of the second fluid into the mixing chamber is greater than that can be absorbed by the molecular sieve component;
   adjusting a temperature and a pressure in the mixing chamber to a critical temperature and a critical pressure of the second fluid, respectively, releasing the first fluid in supercritical phase from the molecular sieve component into the mixing chamber, followed by homogeneously mixing with the second fluid in supercritical phase in the mixing chamber to obtain a homogeneous-phase mixing fluid; and
   introducing the homogeneous-phase mixing fluid into a reaction chamber connected to the mixing chamber for conducting a reaction.

2. The reaction method with the homogeneous-phase supercritical fluid as claimed in claim 1, wherein the first fluid and the second fluid are a fluid in liquid phase and a fluid in gas phase, respectively.

3. The reaction method with the homogeneous-phase supercritical fluid as claimed in claim 2, wherein the first fluid is the fluid in liquid phase selected from water, ethanol, acetone, oxalic acid, ammonia or sulfuric acid.

4. The reaction method with the homogeneous-phase supercritical fluid as claimed in claim 2, wherein the second fluid is the fluid in gas phase selected from carbon dioxide, methane, ethane, propane, ethylene or propylene.

5. The reaction method with the homogeneous-phase supercritical fluid as claimed in claim 1, wherein the molecular sieve component comprises an A-type or X-type molecular sieve.

6. The reaction method with the homogeneous-phase supercritical fluid as claimed in claim 1, wherein the molecular sieve component comprises molecular sieve material made of aluminum oxide, silicon oxide and stainless steel sintered together.

* * * * *